United States Patent
Wang

(10) Patent No.: US 11,281,061 B2
(45) Date of Patent: Mar. 22, 2022

(54) DISPLAY PANEL, METHOD FOR MANUFACTURING DISPLAY PANEL, AND DISPLAY DEVICE

(71) Applicant: HKC CORPORATION LIMITED, Shenzhen (CN)

(72) Inventor: Huiping Wang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 484 days.

(21) Appl. No.: 16/331,151

(22) PCT Filed: Nov. 16, 2018

(86) PCT No.: PCT/CN2018/115825
§ 371 (c)(1),
(2) Date: Mar. 7, 2019

(87) PCT Pub. No.: WO2020/082463
PCT Pub. Date: Apr. 30, 2020

(65) Prior Publication Data
US 2021/0333674 A1    Oct. 28, 2021

(30) Foreign Application Priority Data
Oct. 24, 2018    (CN) .......................... 201811241770.X

(51) Int. Cl.
*G02F 1/1362* (2006.01)
(52) U.S. Cl.
CPC .. *G02F 1/136295* (2021.01); *G02F 1/136209* (2013.01)

(58) Field of Classification Search
None
See application file for complete search history.

(56) References Cited

U.S. PATENT DOCUMENTS

| | | | |
|---|---|---|---|
| 2004/0125057 A1 | 7/2004 | Moon et al. | |
| 2017/0153480 A1* | 6/2017 | Lv | G02F 1/133512 |

FOREIGN PATENT DOCUMENTS

| | | |
|---|---|---|
| CN | 101071218 A | 11/2007 |
| CN | 101833210 A | 9/2010 |
| CN | 103969865 A | 8/2014 |
| CN | 105068339 A | 11/2015 |
| CN | 105093708 A | 11/2015 |
| CN | 105093752 A | 11/2015 |
| TW | 200416465 A | 9/2004 |

OTHER PUBLICATIONS

Huimin Gao, the ISA written comments, Jul. 2019, CN.

* cited by examiner

*Primary Examiner* — Ashok Patel

(57) ABSTRACT

This application discloses a display panel, a method for manufacturing a display panel, and a display device. The display panel includes: a first substrate, a second substrate, a color photoresist layer, a common electrode, and a data line. A first recess recessed toward the first substrate and corresponding to the data line is arranged on the common electrode.

20 Claims, 6 Drawing Sheets

DISPLAY PANEL, METHOD FOR MANUFACTURING DISPLAY PANEL, AND DISPLAY DEVICE

This application claims priority to Chinese Patent Application No. CN201811241770.X, filed with the Chinese Patent Office on Oct. 24, 2018 and entitled "DISPLAY PANEL, METHOD FOR MANUFACTURING DISPLAY PANEL, AND DISPLAY DEVICE", which is incorporated herein by reference in its entirety.

TECHNICAL FIELD

The present disclosure relates to the field of display technologies, and in particular, to a display panel, a method for manufacturing the display panel, and a display device.

BACKGROUND

Statement herein merely provides background information related to the present disclosure and does not necessarily constitute the prior art.

With the development and advance of science and technologies, contributing to hot spots such as thin profile, power saving, and low radiation, liquid crystal displays currently become mainstream products of displays and are widely applied. Most of liquid crystal displays on the market are backlight-type liquid crystal displays, including liquid crystal panels and backlight modules. A working principle of a liquid crystal panel is placing liquid crystal molecules between two parallel glass substrates and applying a drive voltage to the two glass substrates to control rotation directions of the liquid crystal molecules, to refract light of the backlight module to generate a picture.

A thin film transistor-liquid crystal display (TFT-LCD) has performance such as low power consumption, good picture quality, and a relatively high production yield and therefore has currently gradually been dominant in the field of display. In addition, the thin film transistor-liquid crystal display includes a liquid crystal panel and a backlight module. The liquid crystal panel includes a color filter substrate (CF substrate), a thin film transistor substrate (TFT substrate), and a mask, and transparent electrodes are provided on relative inner sides of the substrates. A layer of liquid crystal (LC) molecules is sandwiched between two substrates. Flicker frequently appears in a display panel, resulting in reduction of picture quality of the display panel and influences on the use effect and watching experience. Persons skilled in the art have been researched for a solution to this problem. In this way, a method capable of resolving the problem becomes quite important.

SUMMARY

An objective of the present disclosure is providing a display panel, a method for manufacturing the display panel, and a display device.

To achieve the foregoing objective, the present disclosure provides a display panel, comprising: a first substrate; a second substrate, the first substrate being arranged opposite to the second substrate; a color photoresist layer, formed on the first substrate; a common electrode, formed on the color photoresist layer; and a data line, formed on the second substrate, wherein the common electrode on the first substrate is provided with a first recess, the first recess being recessed toward the first substrate, and a position of the first recess being corresponding to a position of the data line on the second substrate.

The present disclosure further provides a method for manufacturing a display panel, comprising steps of:
forming a color photoresist layer on a first substrate, wherein
the step of forming a color photoresist layer comprises:
forming a recess on the color photoresist layer;
forming a common electrode on the color photoresist layer; and
forming, on the common electrode, a first recess at a position corresponding to the recess on the color photoresist layer, and enabling the first recess to recess toward the first substrate and correspond to a position of the data line on the second substrate.

The present disclosure further provides a display device, comprising the display panel.

Compared with the solution in which a distance between a data line and a common electrode is close, in this application, the common electrode is provided with a first recess recessed toward a first substrate, a distance between the data line and the common electrode is increased, and a thickness of the color photoresist layer is reduced, to further reduce a parasitic capacitance between the data line and the common electrode. In a process of charging and discharging a pixel, occurrence of a situation in which a signal of the common electrode is unstable caused by a change in a voltage of the data line can be effectively avoided, flicker is effectively avoided, and further the picture quality of a display panel is effectively improved.

BRIEF DESCRIPTION OF DRAWINGS

The included accompanying drawings are used to provide further understanding of the embodiments of this application, constitute a part of the specification, and are used to illustrate implementations of this application and explain the principle of this application together with literal descriptions. Apparently, the accompanying drawings in the following descriptions are merely some embodiments of this application, and a person of ordinary skill in the art can also obtain other accompanying drawings according to these accompanying drawings without involving any creative effort. In the accompanying drawings.

DETAILED DESCRIPTION

Figure 1:
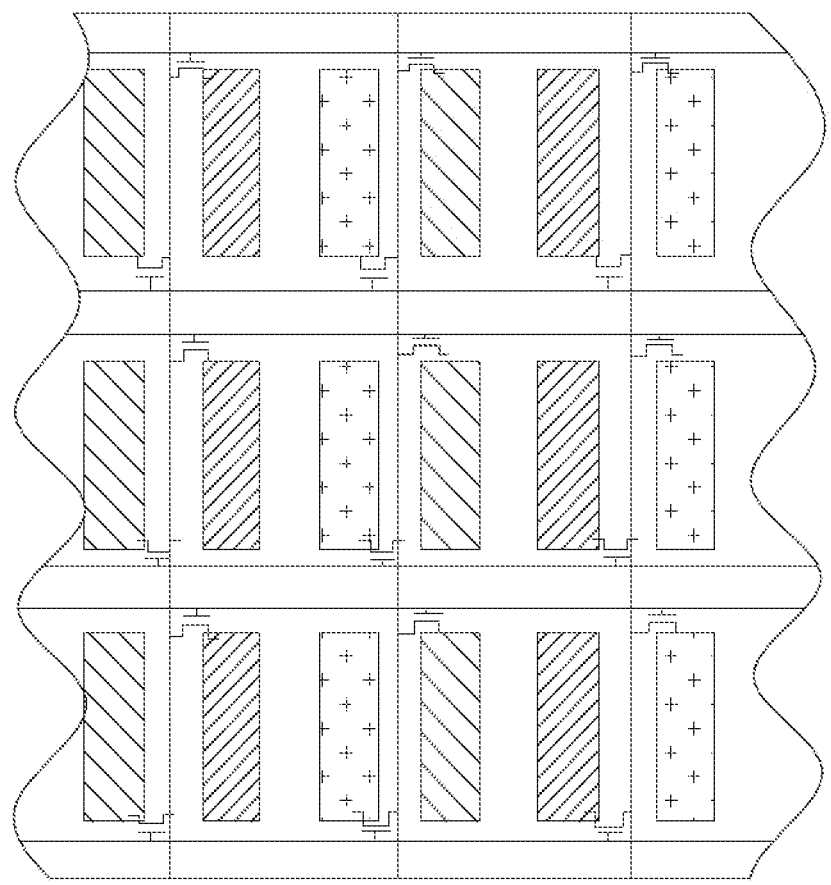
FIG. 1 is a structural schematic diagram of a dual-gate drive according to an embodiment of the present disclosure.

Specific structures and functional details disclosed herein are merely representative, and are intended to describe the objectives of the exemplary embodiments of the present disclosure. However, the present disclosure may be specifically implemented in many alternative forms, and should not be construed as being limited to the embodiments set forth herein.

In the description of the present disclosure, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, the terms such as "first" and "second" are used only for the purpose of description, and should not be understood as indicating or implying the relative importance or implicitly specifying the number of the indicated technical features. Hence, features defined by "first" or "second" may explicitly indicate or implicitly include one or more of the features. In the description of the present disclosure, unless otherwise stated, "a plurality of" means two or more than two. In addition, the terms "include", "comprise" and any variant thereof are intended to cover non-exclusive inclusion.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in the present disclosure according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

This application is further described below with reference to the accompanying drawings and embodiments.

Figure 2:
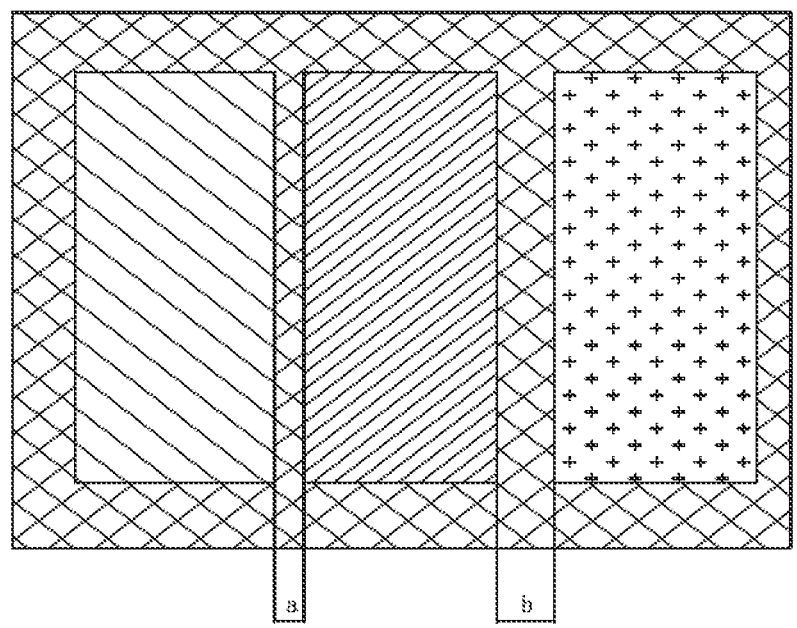
FIG. 2 is a structural schematic diagram of a pixel according to an embodiment of the present disclosure.
Figure 3:
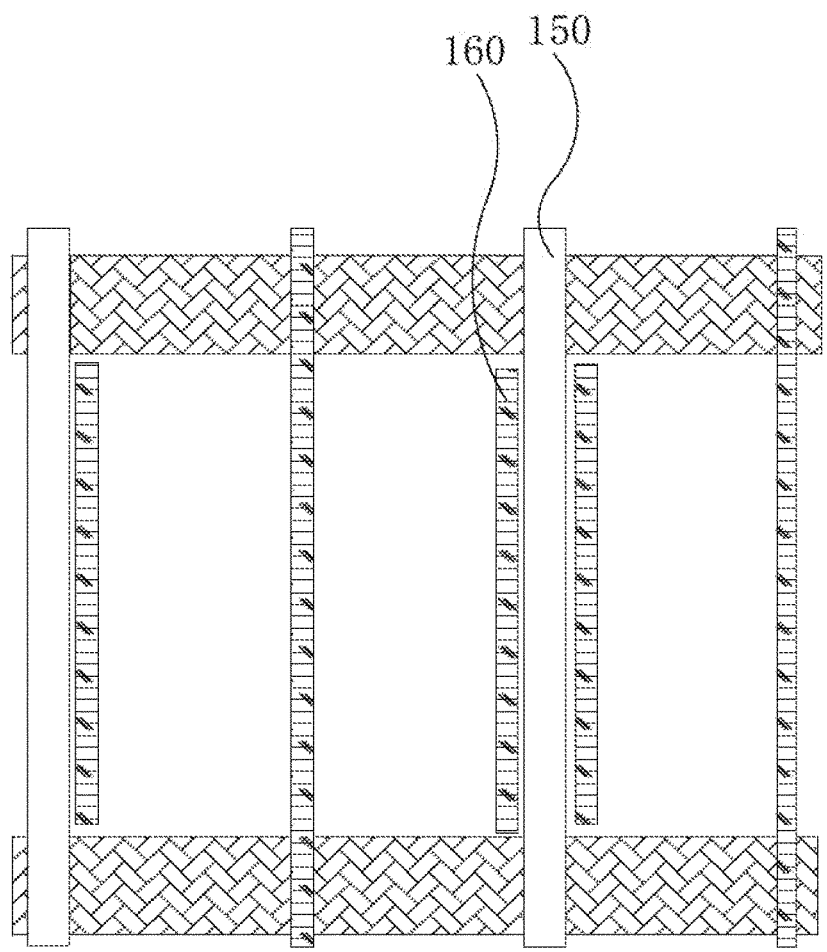
FIG. 3 is a structural schematic diagram of a circuit arrangement according to an embodiment of the present disclosure.

A dual-gate drive is a pixel drive design known by the inventor, and has an apparent cost advantage in the structure of a gate driver on array (GOA). In the dual-gate drive, a quantity of gate lines is doubled, and a quantity of data lines is reduced by half. FIG. 1 shows a basic structure of a dual-gate drive. FIG. 2 shows a structure of a pixel array side and a color filter (CF) side of the dual-gate drive. The array side mainly includes a gate line, a data line, and an array common line (A-Com) providing a common electrode. The color filter (CF) side mainly includes an R/G/B color filter for providing colors, a black matrix (BM) configured to shield a non-color filter region to avoid light leakage and avoid mixing of color filters in different colors, and a indium tin oxide (ITO) covering the whole surface and used as a color filter common electrode (CF-Com). In FIG. 2, a width of a is less than a width of b. A metal circuit at a first metal wire pack at a corresponding position on the lower substrate to which b corresponds is complex. A width of the black matrix (BM) shall completely cover the metal circuit to ensure no light leakage. The portion where there is a circuit is covered by the black matrix (BM). Distances of the black matrix (BM) between two subpixels are different, where a (a=14±2 μm) is a width of the black matrix (BM) above a single common electrode line, and b (b=21±2 μm) is a width of the black matrix (BM) above a data line. First, the portion a is an edge of a color filter and is close to a metal edge at the array side. The black matrix (BM) at the portion a is right above the common electrode line. The width a is set to be close to a width of the signal common electrode line, which is slightly wider than the common electrode line herein, to ensure no light leakage while guaranteeing a small aperture ratio as far as possible. Second, the portion a is a position where two color filters are adjacent to each other. Due to limitations of the precision of a manufacturing process for color filters, there is an overlap of color filters herein, which may affect a picture display effect. The black matrix (BM) may alleviate influences of the color blending at the position on the picture quality. Therefore, in the present invention, the black matrix (BM) side with the width of a is defined as a narrow frame area, and the black matrix (BM) side with the width of b is defined as a wide frame area. Portions a and b appear alternately at two sides of the subpixels, and a thickness of the black matrix (BM) is consistent at all positions, which is always 1±0.3 μm.

As shown in FIG. 4 to FIG. 8, in an embodiment, a display panel 100 is disclosed, including: a first substrate 110; a second substrate 120, the first substrate 110 being arranged opposite to the second substrate 120; a color photoresist layer 130, formed on the first substrate 110; a common electrode 140, formed on the color photoresist layer 130; and a data line 150, formed on the second substrate 120, where the common electrode 140 on the first substrate 110 is provided with a first recess 141, the first recess 141 being recessed toward the first substrate 110, and a position of the first recess 141 being corresponding to a position of the data line 150 on the second substrate 120.

Figure 4:
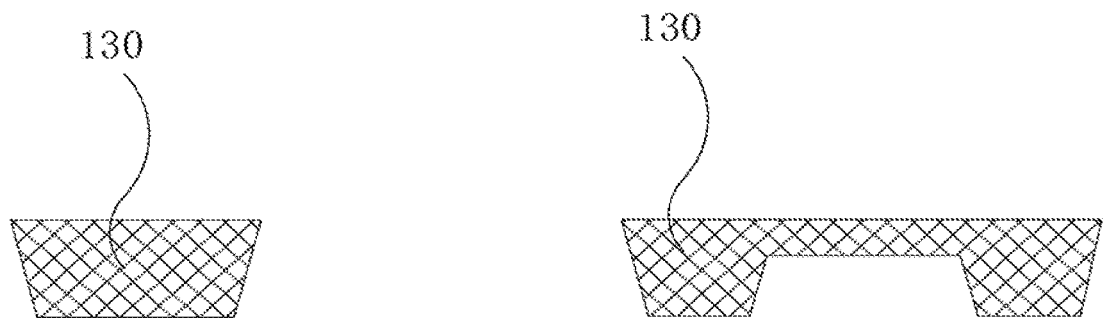
FIG. 4 is a structural schematic diagram of a color photoresist layer according to an embodiment of the present disclosure.

Compared with the solution in which a distance between a data line 150 and a common electrode 140 is close, in this application, the common electrode 140 is provided with a first recess 141 recessed toward a first substrate 110, a distance between the data line 150 and the common electrode 140 is increased, and a thickness of the color photoresist layer 130 is reduced, to further reduce a parasitic capacitance between the data line 150 and the common electrode 140. In a process of charging and discharging a pixel, occurrence of a situation in which a signal of the common electrode 140 is unstable caused by a change in a voltage of the data line 150 can be effectively avoided, flicker is effectively avoided, and further the picture quality of a display panel 100 is effectively improved. FIG. 4 shows designs of the color photoresist layer 130 at two sides of a subpixel, the left side shows a design of the corresponding color photoresist layer 130 when there is no data line 150 on the first substrate 110, and the right side shows a design of the corresponding color photoresist layer 130 when there is a data line 150 on the first substrate 110.

Figure 5:
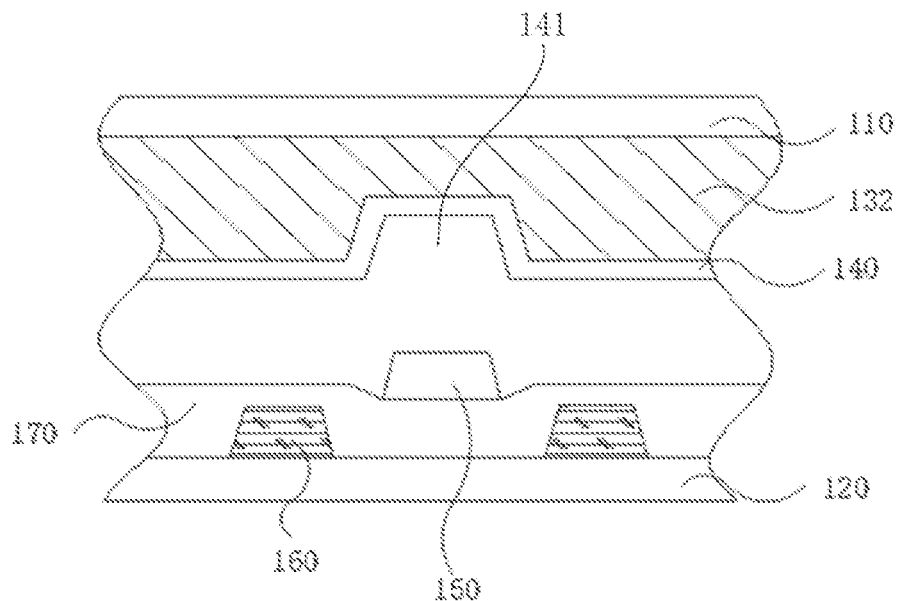
FIG. 5 is a structural schematic diagram of a display panel according to an embodiment of the present disclosure.

As shown in FIG. 5, in an embodiment, the color photoresist layer 130 includes a black color photoresist layer 131. The black color photoresist layer 131 is provided with a recess. The first recess 141 is formed in the recess of the black color photoresist layer 131. This is a method for forming the first recess 141.

Figure 6:
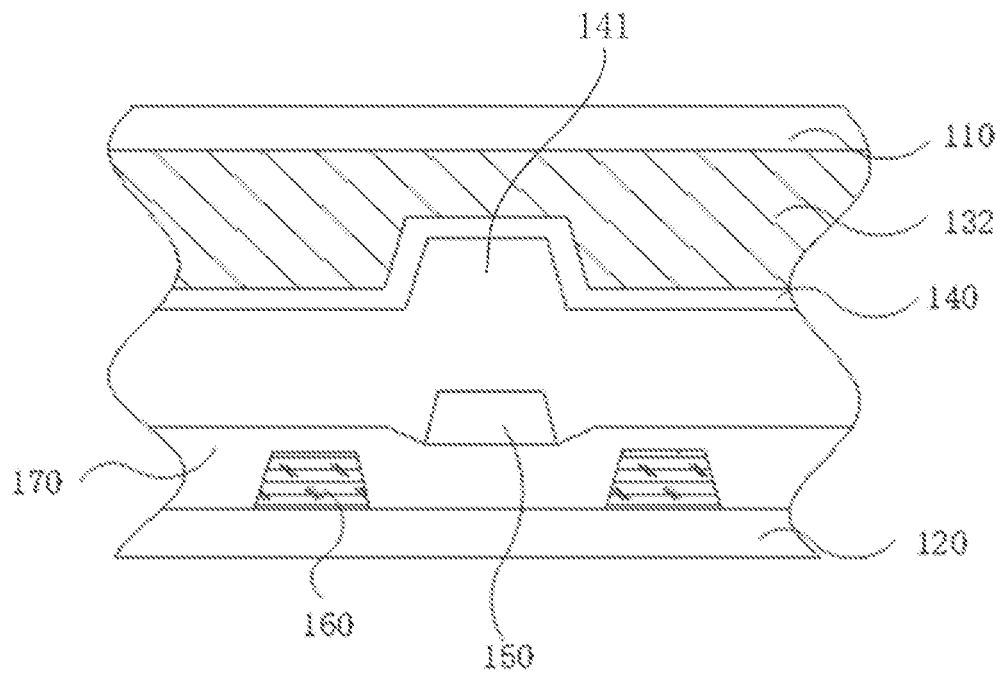
FIG. 6 is a structural schematic diagram of another display panel according to an embodiment of the present disclosure.

As shown in FIG. 6, in an embodiment, the color photoresist layer 130 includes an R/G/B color photoresist layer 132. The R/G/B color photoresist layer 132 is provided with a recess. The first recess 141 is formed in the recess of the R/G/B color photoresist layer 132. This is another method for forming the first recess 141.

Figure 7:
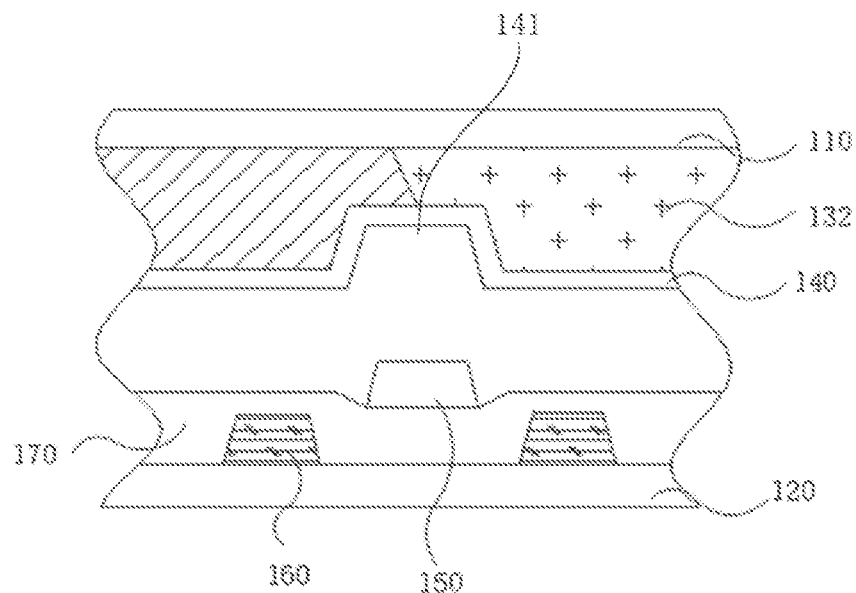
FIG. 7 is a structural schematic diagram of another display panel according to an embodiment of the present disclosure.
Figure 8:
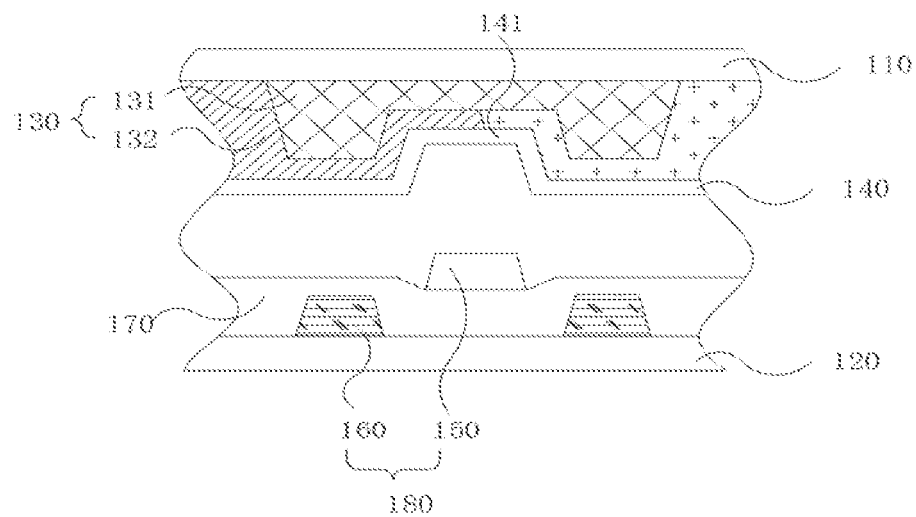
FIG. 8 is a structural schematic diagram of another display panel according to an embodiment of the present disclosure.

As shown in FIG. 7 to FIG. 8, in an embodiment, the color photoresist layer 130 includes a black color photoresist layer 131 and an R/G/B color photoresist layer 132. The black color photoresist layer 131 and the R/G/B color photoresist layer 132 are each provided with a recess. The R/G/B color photoresist layer 132 is formed on the black color photoresist layer 131. The first recess 141 is formed in the recess of the R/G/B color photoresist layer 132. This is another method for forming the first recess 141, by which the recess can be formed more flexibly.

In this solution, the recess of the R/G/B color photoresist layer 132 may be formed at a connection corresponding to two different color filters.

In an embodiment, a width of the first recess 141 is greater than a width of the data line 150.

In this solution, the data line 150 and common electrode lines 160 are located on different metal layers, and there is an insulating layer 170 between the data line 150 and the common electrode lines 160; a height of the data line 150 is different from heights of the common electrode lines 160, a width of the first recess 141 is greater than a width of the data line 150, and a distance between the data line 150 and the first recess 141 is increased, so that a distance between the data line 150 and the common electrode 140 is increased, thereby reducing a parasitic capacitance between the data line 150 and the common electrode 140. In a process of charging and discharging a pixel, occurrence of a situation in which a signal of the common electrode 140 is unstable caused by a change in a voltage of the data line 150 can be effectively avoided, flicker is effectively avoided, and further the picture quality of a display panel 100 is effectively improved.

In an embodiment, the display panel 100 includes common electrode lines 160. The common electrode lines 160 are located at two sides of the data line 150. The data line 150 and the common electrode lines 160 at the two sides of the data line 150 form a first metal wire pack 180. A width of the first recess 141 is less than a width of the first metal wire pack 180.

In this solution, the data line 150 and the common electrode lines 160 are located on different metal layers, and there is an insulating layer 170 between the data line 150 and the common electrode lines 160; a height of the data line 150 is different from heights of the common electrode lines 160, a width of the first recess 141 is greater than a width of the data line 150 and is less than a width of the first metal wire pack 180, and a distance between the data line 150 and the recess is increased, so that a distance between the data line 150 and the common electrode 140 is increased, thereby reducing a parasitic capacitance between the data line 150 and the common electrode 140. In a process of charging and discharging a pixel, occurrence of a situation in which a signal of the common electrode 140 is unstable caused by a change in a voltage of the data line 150 can be effectively avoided, flicker is effectively avoided, and further the picture quality of a display panel 100 is effectively improved.

In an embodiment, a thickness of the black color photoresist layer 131 at a position corresponding to the recess is X, where 0.4 micrometer≤X≤0.8 micrometer.

Compared with the solution in which a thickness of the black color photoresist layer 131 at a position corresponding to the recess is greater than or equal to 0.7 μm and is less than or equal to 1.3 μm, in this solution, the thickness of the black color photoresist layer 131 at the position corresponding to the recess is X, where 0.4 μm≤X≤0.8 μm. If the thickness of the black color photoresist layer 131 is less than 0.4 μm, the recess is easy to damage and light leakage occurs. If the thickness of the black color photoresist layer 131 is greater than 0.8 μm, a parasitic capacitance exists between the common electrode 140 and the data line 150 in the recess, and a change in a voltage of the data line 150 may easily cause a change in a signal of the common electrode 140. This solution not only ensures the rigidness of the recess, but also can reduce the parasitic capacitance between the common electrode 140 and the data line 150 to the ultimate extent, to effectively avoid influences of a voltage change in the data line 150 on a signal of the common electrode 140, to further avoid occurrence of flicker of the display panel 100 and improve the picture quality of the display panel 100.

Figure 9:
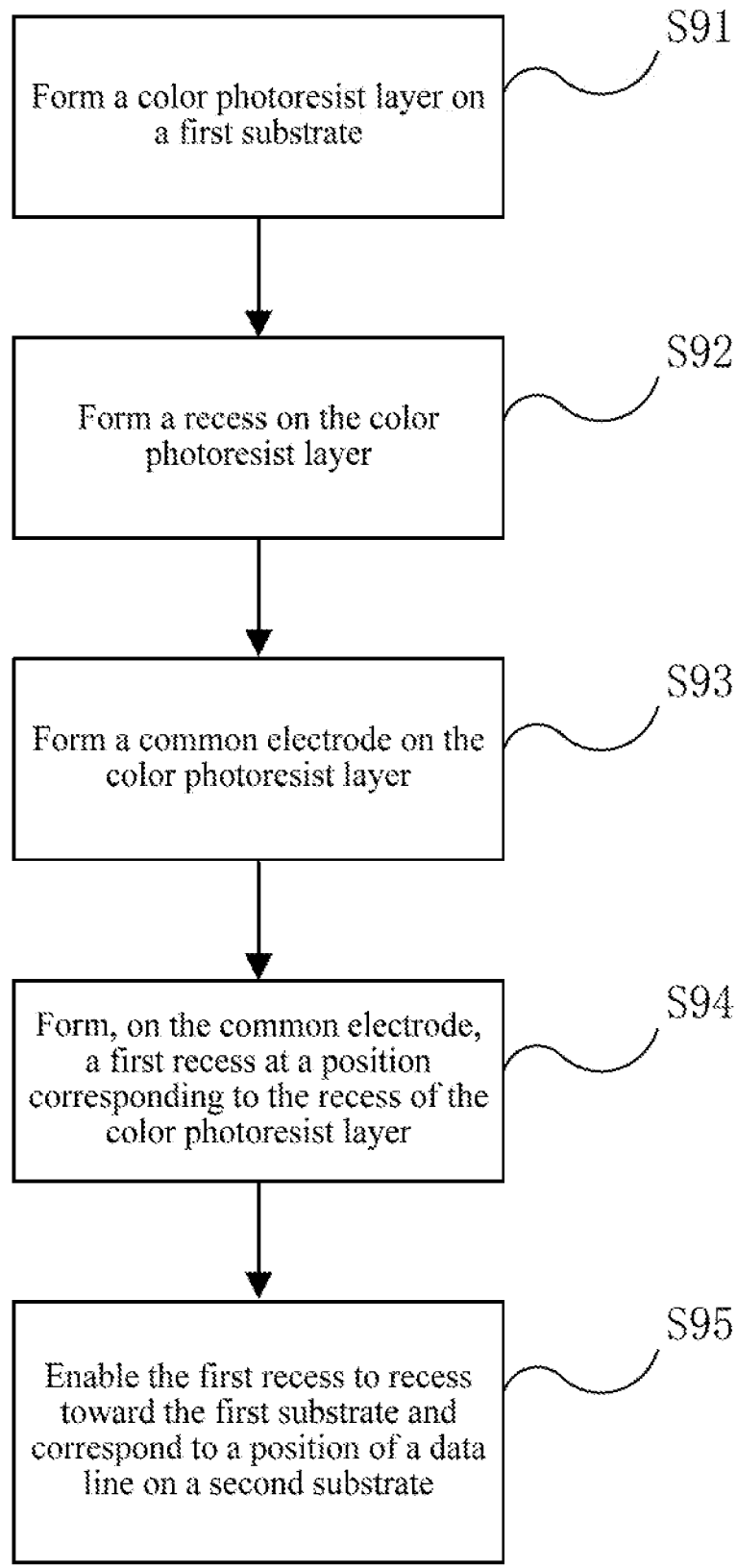
FIG. 9 is an application flowchart of a method for manufacturing a display panel according to an embodiment of the present disclosure.

In another embodiment, referring to FIG. 9, disclosed is a method for manufacturing a display panel, including steps of:

S91: Form a color photoresist layer on a first substrate.

S92: The step of forming a color photoresist layer includes: forming a recess on the color photoresist layer.

S93: Form a common electrode on the color photoresist layer.

S94: Form, on the common electrode, a first recess at a position corresponding to the recess of the color photoresist layer.

S95: Enable the first recess to recess toward the first substrate and correspond to a position of a data line on the second substrate.

In this solution, by forming, on the common electrode, a first recess at a position corresponding to the recess of the color photoresist layer, a distance between the data line and the common electrode is increased, a thickness of the color photoresist layer is reduced, and further a parasitic capacitance between the data line and the common electrode is reduced. In a process of charging and discharging a pixel, occurrence of a situation in which a signal of the common electrode is unstable caused by a change in a voltage of the data line can be effectively avoided, flicker is effectively avoided, and further the picture quality of a display panel is effectively improved.

In an embodiment, step S94 of forming, on the common electrode, a first recess at a position corresponding to the recess of the color photoresist layer includes:

forming, on the common electrode, a first recess with a width greater than that of the data line at the position corresponding to the recess on the color photoresist layer.

In this solution, the data line and the common electrode lines are located on different metal layers, a height of the data line is different from heights of the common electrode lines, a width of the first recess is greater than a width of the data line, and a distance between the data line and the first recess is increased, so that a distance between the data line and the common electrode is increased, thereby reducing a parasitic capacitance between the data line and the common electrode. In a process of charging and discharging a pixel, occurrence of a situation in which a signal of the common electrode is unstable caused by a change in a voltage of the data line can be effectively avoided, flicker is effectively avoided, and further the picture quality of a display panel is effectively improved.

In an embodiment, the step of forming, on the common electrode, a first recess with a width greater than that of the data line at the position corresponding to the recess on the color photoresist layer includes:

forming, on the common electrode, a first recess with a width less than that of the first metal wire pack at the position corresponding to the recess on the color photoresist layer.

In this solution, the data line and the common electrode lines are located on different metal layers, a height of the data line is different from heights of the common electrode lines, a width of the first recess is greater than a width of the data line and is less than a width of the first metal wire pack, and a distance between the data line and the recess is increased, so that a distance between the data line and the common electrode is increased, thereby reducing a parasitic capacitance between the data line and the common electrode. In a process of charging and discharging a pixel, occurrence of a situation in which a signal of the common electrode is unstable caused by a change in a voltage of the data line can be effectively avoided, flicker is effectively avoided, and further the picture quality of a display panel is effectively improved.

Figure 10:
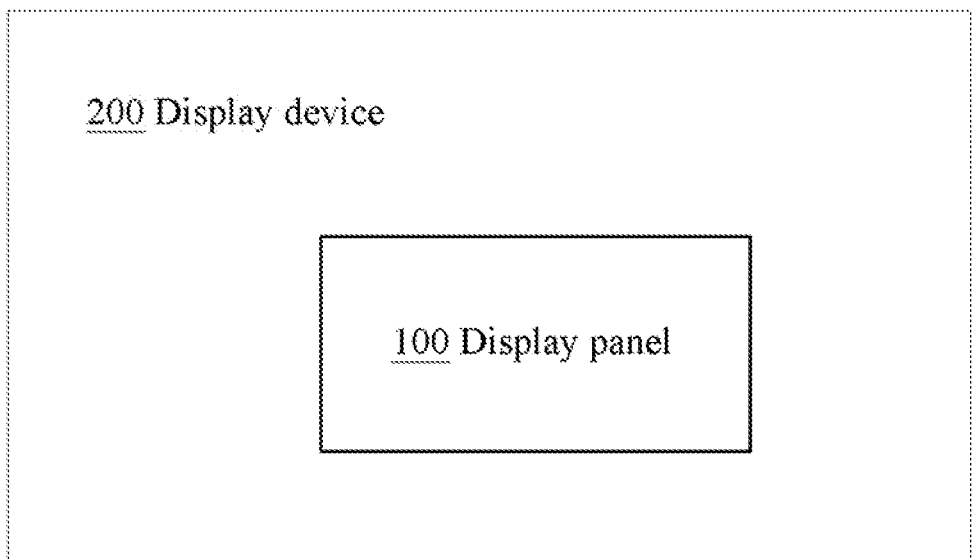
FIG. 10 is a schematic diagram of a display device according to an embodiment of the present disclosure.

In another embodiment, referring to FIG. 10, disclosed is a display device 200, including the foregoing display panel 100.

It should be noted that the definitions to the steps involved in this solution are not, on the premise of not influencing implementation of the specific solution, considered as definitions to the order of priority of the steps. A step written previously may be performed first or may be performed later, or the steps may even be performed simultaneously as long as this solution can be implemented. This shall be considered to fall within the protection scope of the present disclosure.

The panel in the present disclosure may be a twisted nematic (TN) panel, an in-plane switching (IPS) panel, or a multi-domain vertical alignment (VA) panel, and may certainly be any other suitable type of panel.

The foregoing contents are detailed descriptions of the present disclosure in conjunction with specific optional embodiments, and it should not be considered that the specific implementation of the present disclosure is limited to these descriptions. Persons of ordinary skill in the art can further make simple deductions or replacements without departing from the concept of the present disclosure, and such deductions or replacements should all be considered as falling within the protection scope of the present disclosure.

What is claimed is:

1. A display panel, comprising:
   a first substrate;
   a second substrate, the first substrate being arranged opposite to the second substrate;
   a color photoresist layer, formed on the first substrate;
   a common electrode, formed on the color photoresist layer; and
   a data line, formed on the second substrate, wherein
   the common electrode on the first substrate is provided with a first recess, the first recess being recessed toward the first substrate, and a position of the first recess being corresponding to a position of the data line on the second substrate;
   wherein every two adjacent subpixels are coupled to the same data line and are respectively coupled to two different gate lines.

2. The display panel according to claim 1, wherein the color photoresist layer comprises a black color photoresist layer, the black color photoresist layer is provided with a recess, and the first recess is formed in the recess of the black color photoresist layer.

3. The display panel according to claim 2, wherein a thickness of the black color photoresist layer at a position corresponding to the recess is X, wherein 0.4 micrometer≤X≤0.8 micrometer.

4. The display panel according to claim 2, wherein the recess is defined in the black color photoresist layer itself without penetrating through the black color photoresist layer, and the common electrode is coated on and attached to the black color photoresist layer to form the first recess at the position corresponding to the recess.

5. The display panel according to claim 4, wherein the common electrode has a uniform thickness throughout an entire area of the common electrode.

6. The display panel according to claim 2, wherein the display panel further comprises two common electrode lines respectively disposed at two sides of the data line, wherein the data line and the two common electrode lines disposed at the two sides of the data line form a first metal wire pack, and the black color photoresist layer has a width that is greater than that of the first metal wire pack and is configured to entirely cover the first metal wire pack.

7. The display panel according to claim 1, wherein the color photoresist layer comprises an R/G/B color photoresist layer, the R/G/B color photoresist layer is provided with a recess, and the first recess is formed in the recess of the R/G/B color photoresist layer itself, wherein the recess of the R/G/B color photoresist layer is a blind recess that does not penetrate through the R/G/B color photoresist layer.

8. The display panel according to claim 1, wherein a width of the first recess is greater than a width of the data line.

9. The display panel according to claim 8, wherein the display panel comprises common electrode tines, the common electrode tines being located at two sides of the data line; the data line and the common electrode lines at the two sides of the data line form a first metal wire pack; and a width of the first recess is less than a width of the first metal wire pack.

10. The display panel according to claim 9, wherein the width of the first recess is slightly greater than that of the data line, and left and right edges of the first recess don't yet overlap the common electrode lines located at the two sides of the data line.

11. The display panel according to claim 1, wherein the color photoresist layer comprises both a black color photoresist layer and an R/G/B color photoresist layer, wherein the black color photoresist layer defines a groove, the R/G/B color photoresist layer having a uniform thickness throughout an entire area is coated on and attached to the black color photoresist layer to define another groove, and wherein the common electrode having a uniform thickness throughout an entire area is coated on and attached to the R/G/B color photoresist layer to form the first recess, wherein the groove of the R/G/B color photoresist layer has a less width than that of the groove of the black color photoresist layer, and the first recess has a less width than that of the groove of the R/G/B color photoresist layer.

12. The display panel according to claim 11, wherein the R/G/B color photoresist layer comprises a first color filter and a second color filter symmetrically disposed at two sides of the data line, wherein the first color filter overlaps a left half width of the groove of the black color photoresist layer, and the second color filter overlaps a right half width of the groove of the black color photoresist layer.

13. A method for manufacturing a display panel, wherein the display panel comprises a first substrate and a second substrate arranged opposite to the first substrate;

and the manufacturing method comprises a step of forming a first substrate, wherein the step of forming the first substrate comprises:

forming a color photoresist layer on the first substrate;

forming a recess on the color photoresist layer;

forming a common electrode on the color photoresist layer; and forming, on the common electrode, a first recess at a position corresponding to the recess on the color photoresist layer, and enabling the first recess to recess toward the first substrate and correspond to a position of the data line on the second substrate;

wherein every two adjacent subpixels are coupled to the same data line and are respectively coupled to two different gate lines.

14. The method for manufacturing a display panel according to claim 13, wherein the step of forming a color photoresist layer on a first substrate comprises: forming a black color photoresist layer on the first substrate, forming the recess on the black color photoresist layer itself without penetrating through the black color photoresist layer, and forming the first recess in the recess of the black color photoresist layer, wherein the common electrode is coated on and attached to the black color photoresist layer to form the first recess at the position corresponding to the recess, wherein the common electrode has a uniform thickness throughout an entire area of the common electrode.

15. The method for manufacturing a display panel according to claim 13, wherein the step of forming a color photoresist layer on a first substrate comprises: forming an R/G/B color photoresist layer on the first substrate, forming the recess on the R/G/B color photoresist layer itself, and forming the first recess in the recess of the R/G/B color photoresist layer, wherein the recess of the R/G/B color photoresist layer is a blind recess that does not penetrate through the R/G/B color photoresist layer.

16. The method for manufacturing a display panel according to claim 13, wherein the step of forming a color photoresist layer on a first substrate comprises: forming a black color photoresist layer on the first substrate, forming an R/G/B color photoresist layer on the black color photoresist layer, forming a recess on the black color photoresist layer and the R/G/B color photoresist layer, and forming the first recess in the recess of the R/G/B color photoresist layer.

17. The method according to claim 16, wherein the R/G/B color photoresist layer comprises a first color filter and a second color filter symmetrically disposed at two sides of the data line, wherein the first color filter overlaps a left half width of the groove of the black color photoresist layer, and the second color filter overlaps a right half width of the groove of the black color photoresist layer.

18. The method for manufacturing a display panel according to claim 13, wherein the step of forming, on the common electrode, a first recess at a position corresponding to the recess on the color photoresist layer comprises:

forming, on the common electrode, a first recess with a width greater than that of the data line at the position corresponding to the recess on the color photoresist layer.

19. The method for manufacturing a display panel according to claim 18, wherein the step of forming, on the common electrode, a first recess with a width greater than that of the data line at the position corresponding to the recess on the color photoresist layer comprises:

arranging common electrode lines at two sides of the data line, the data line and the common electrode lines at the two sides form a first metal wire pack; and forming, on the common electrode, a first recess with a width less than that of the first metal wire pack at the position corresponding to the recess on the color photoresist layer.

20. A display device, comprising:

a first substrate;

a second substrate, the first substrate being arranged opposite to the second substrate;

a color photoresist layer, formed on the first substrate;

a common electrode, formed on the color photoresist layer; and a data line, formed on the second substrate, wherein the common electrode on the first substrate is provided with a first recess, the first recess being recessed toward the first substrate, and a position of the first recess being corresponding to a position of the data line on the second substrate;

wherein every two adjacent subpixels are coupled to the same data line and respectively coupled to two different gate lines.

* * * * *